Feb. 12, 1929.

J. E. DUDLEY, JR 1,701,718

APHIS REMOVING MACHINE

Filed April 13, 1925

INVENTOR.

John E. Dudley Jr.

BY

Morsell, Keeney & Morsell.

ATTORNEYS.

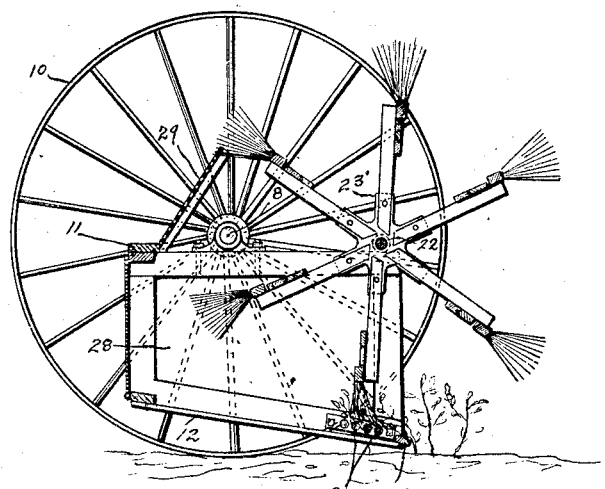
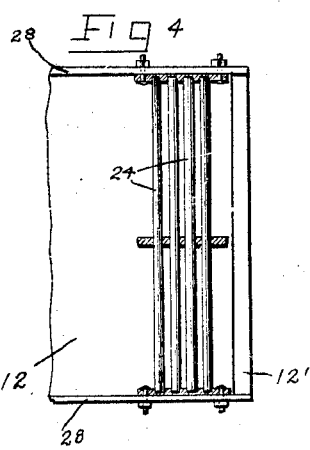
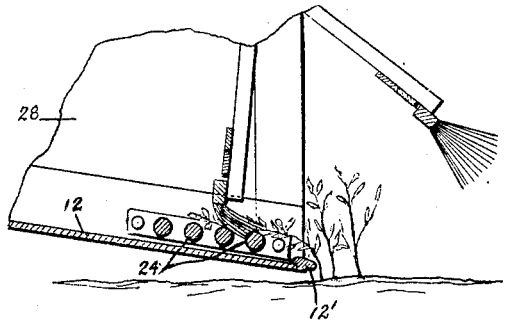

Patented Feb. 12, 1929.

1,701,718

UNITED STATES PATENT OFFICE.

JOHN E. DUDLEY, JR., OF MADISON, WISCONSIN, ASSIGNOR OF ONE-HALF TO EDWARD M. SEARLS, OF MADISON, WISCONSIN.

APHIS-REMOVING MACHINE.

Application filed April 13, 1925. Serial No. 22,764.

This invention relates to improvements in aphis removing machines.

The aphis and other like insects do a great amount of damage, and are responsible for heavy losses to the growers of canning, table and seed peas in the United States, and furthermore, are also responsible for great injury to alfalfa and some of the clovers in several States of the Union.

The aphis lives over winter in the egg state on alfalfa and the clovers; the eggs hatch in early spring into females which feed and reproduce for a period on these crops, later migrating to peas, where under favorable weather conditions, and in the absence of control measures, they can reproduce at a tremendous rate and often entirely ruin fields of peas. In certain sections of the country where no peas are grown or where peas are a minor crop, the aphis spends its entire time on alfalfa and the clovers, often ruining the entire first crop with the subsequent lowering of the vitality of the crops following. The aphis injures the plants by sucking the juices through its tiny beak, which seriously lowers the yield and quality of the plants. The aphis has two peculiarities which make it especially susceptible to being collected: First, it tends to congregate on the upper part of the vine near the tender, succulent, fast growing head; second, it readily falls from the vine when the vine is touched or shaken.

The aphis attacks peas when they are from six to ten inches high, according to the season, and generally continues its injury until they are harvested, generally from three to six weeks duration, and it is possible to collect the aphis from the time it first appears until the peas are in blossom, and perhaps longer. The aphis has several natural enemies, which together very often effect its control by the middle or latter part of the season, but seldom, if ever, before serious damage has been done.

It is one of the objects of the present invention to provide a machine which will remove the aphis from the plants and collect them in a container carried by the machine.

A further object of the invention is to provide an aphis removing machine constructed to remove the aphis from the plants without injury to the plants and without destroying the natural enemies of the aphis.

A further object of the invention is to provide an aphis removing machine which will also collect insects other than aphides which are injurious to plant life.

A further object of the invention is to provide an aphis removing machine having means for adjusting the working portion of the machine to operate on crops of different heights, and also to permit raising the working portion of the machine in passing over small stones or mounds of earth.

A further object of the invention is to provide an aphis removing machine in which the weight of the operator acts to counterbalance the weight of the forward portion of the machine.

A further object of the invention is to provide an aphis removing machine in which the animal drawing the machine travels directly in front of one of the supporting wheels of the machine to avoid stepping on plants from which the aphides have not yet been removed.

A further object of the invention is to provide an aphis remover which is of simple construction, is strong and durable and is very efficient in operation, and is well adapted for the purpose described.

With the above and other objects in view, the invention consists of the improved aphis removing machine and its parts and combinations as set forth in the claim and all equivalents thereof.

In the accompanying drawings in which the same reference characters indicate the same parts in all of the views:

Fig. 3 is a central vertical sectional view thereof;

Fig. 4 is a horizontal sectional detail view of the front portion of the hopper; and Fig. 5 is a vertical detail view on a larger scale.

Figure 1:
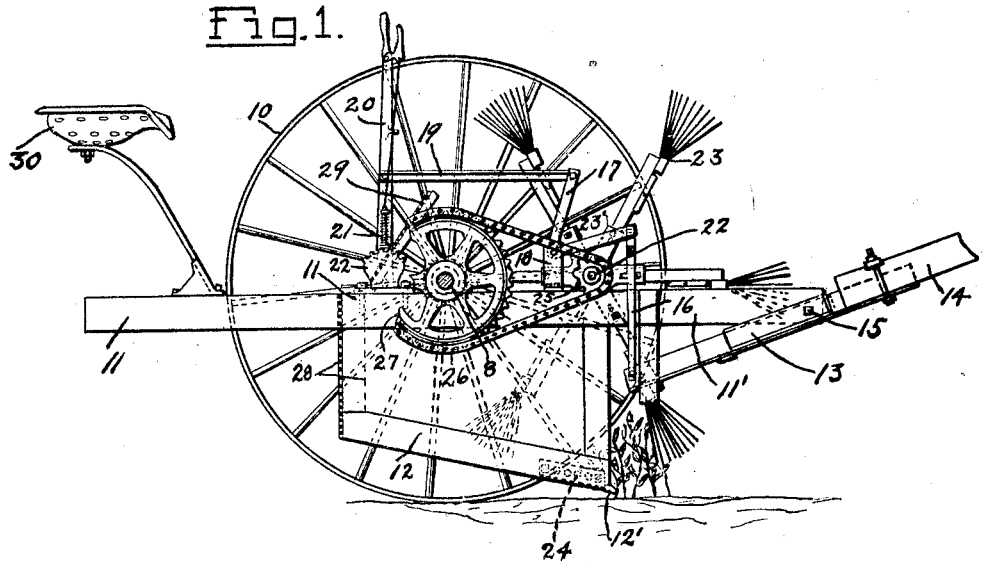
Fig. 1 is a side view of the improved aphis removing machine, parts broken away.
Figure 2:
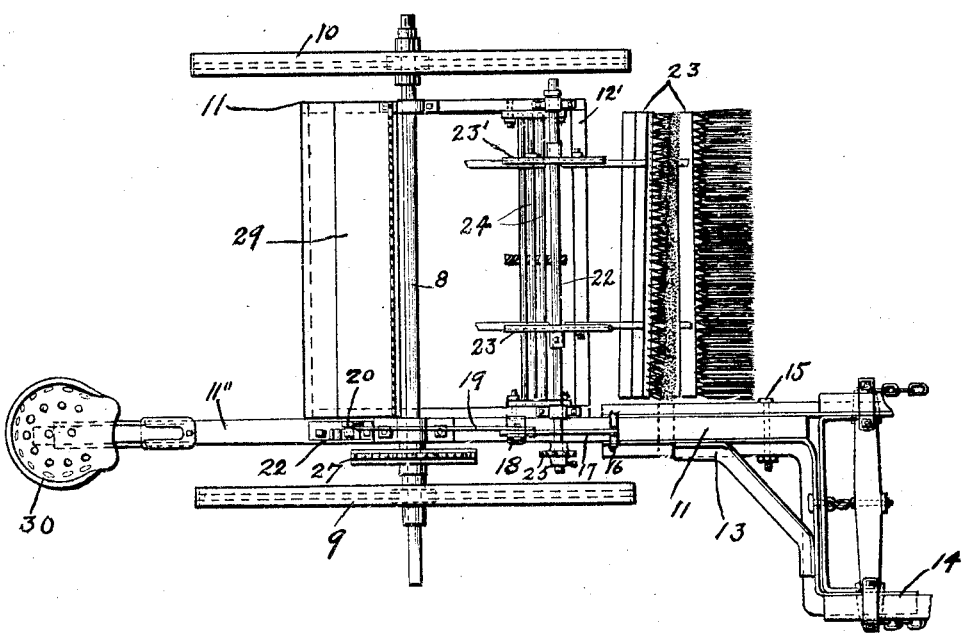
Fig. 2 is a top view thereof.

Referring to the drawings, the numeral 8 indicates a shaft or axle upon which is journaled supporting wheels 9 and 10. A horizontal frame 11 is connected to and supported from the axle and is provided with a depending and forwardly and downwardly inclined hopper 12 open at its forward end. One of the side members 11' is of greater length than the other and extends forwardly and rearwardly of the main portion of the frame and to the front extension a rear two part extension member 13 of the shafts 14 is pivotally connected by a pivot bolt 15. Said rear extension member parts are pivotally connected at their rear ends of links 16 which extend upwardly and at their upper ends are pivotally connected to the forwardly extending arm of a bell crank lever 17. The bell crank lever is fulcrumed on a bracket 18 mounted on the frame 11 and the upwardly extending arm of said bell crank lever is connected to a link 19. The rear end of the link 19 is connected to a control lever 20 so that by pulling said lever rearwardly the front portion of the frame will be tipped upwardly, and the lower front edge 12′ of the hopper 12 will be raised from the ground to the desired height. As the forward portions of the shafts will be connected to the animal drawing the machine, the upward movement of the rear end portions of the shafts will elevate the front edge portion of the hopper. The lever 20 is provided with a spring actuated locking dog 21 and a segmental rack 22 for holding the hopper in adjusted position.

A shaft 22 journaled on the upper forward portion of the machine carries opposite spiders 23′ to which a series of spirally trending brushes 23 are adjustably connected and are adapted to sweep inwardly against the forward edge of the hopper, as clearly shown in Figs. 3 and 5. These brushes are formed of comparatively long bristles or other material which will not injure the plants brushed. The forward portion of the hopper is provided with transverse rods 24 against which the plants are pressed in brushing the upper side portions thereof. As the machine is traveling during the brushing operation, the lower side portions of the plants will rub against the transverse rods 24 and the aphides and other insects will be scraped from the lower surfaces of the plants and drop into the hopper. To prevent injury to the plants, the forward edge 12′ of the hopper is of rounded formation. The angular adjustment of the hopper permits the hopper to hold the maximum number of aphides and other insects and also presents the smallest possible space under which the plants are bent while being brushed.

One end portion of the brush shaft 22 is provided with a sprocket wheel 25, and a sprocket chain 26 engaging said wheel extends around a sprocket wheel 27 connected to the supporting wheel 9 to transmit rotation from the supporting wheel to the brushes as the machine travels along.

The rear and side portions 28 of the hopper are formed of cloth or canvas to permit the free passage of air currents formed by the rotation of the brushes, in order to permit the aphides or other insects brushed from the plants, to freely drop into the hopper. An upward extension 29 to the hopper is provided to better catch the insects brushed from the plants.

The rear extension 11″ of the frame 11 carries a seat 30 which is so positioned with relation to the weight of the portion of the machine in front of the supporting wheels that the weight of the average driver will counterbalance said forward weight of the machine. The rear extension is of sufficient length to permit adjustment of the position of the seat thereon to secure the desired counterbalance.

In use it is only necessary to drive over the field covered with the plants, and the action of the brushes in connection with the transverse rods will sweep or scrape the greater number of the aphides and other insects from the plants into the hopper. When the bottom portion of the hopper is covered several inches deep with the insects, the temperature of the struggling mass will increase twenty to forty degrees, and the aphides will be destroyed by the heat thus engendered, and the mass be dumped upon the ground. As the heat engendered is not sufficient to destroy the great majority of predators and parasites which are so beneficial in helping to hold the aphides in check, they may be returned to the field or in time will work back to the plants.

The machine is of very simple construction, is easily operated by one man, and is well adapted for the purpose described.

What I claim as my invention is:

An insect removing machine, comprising a frame, a hopper depending therefrom and provided with a lower forward edge portion forming the lower part of the opening to said hopper, a rotatable member journaled on the frame and having spirally trending brushes which engage plants to swing them into engagement with and over the front edge portion of and partly into the hopper and brush the upper surfaces thereof to remove the insects therefrom and deposit them into the hopper, the front edge portion of the hopper being forward of a vertical line drawn through the axis of the rotatable member, transversely extending means adjacent the forward edge of and positioned above and spaced from the bottom portion of the hopper and engaged by the plants for removing insects from the lower surfaces of the plants and depositing them into the hopper, and means for rotating the brush member.

In testimony whereof, I affix my signature.

JOHN E. DUDLEY, Jr.